(12) United States Patent
Kim et al.

(10) Patent No.: US 12,103,780 B2
(45) Date of Patent: Oct. 1, 2024

(54) SYSTEM FOR INVERTING PACKAGING BOX

(71) Applicant: CJ CHEILJEDANG CORPORATION, Seoul (KR)

(72) Inventors: Myung Ho Kim, Jincheon-eup (KR); Sung Woo Park, Jincheon-eup (KR); Bong Yong Sung, Gimhae-si (KR); Hee Dong Son, Changwon-si (KR); Dae Hwa Kim, Osan-si (KR); Sun Kyu Kim, Hwaseong-si (KR); Soo Hyun Kim, Gimpo-si (KR); Hak Dong Kim, Suwon-si (KR); In Soo Jung, Suwon-si (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 81 days.

(21) Appl. No.: 17/801,201

(22) PCT Filed: Feb. 19, 2021

(86) PCT No.: PCT/KR2021/002133
§ 371 (c)(1),
(2) Date: Aug. 19, 2022

(87) PCT Pub. No.: WO2021/167404
PCT Pub. Date: Aug. 26, 2021

(65) Prior Publication Data
US 2023/0075513 A1    Mar. 9, 2023

(30) Foreign Application Priority Data
Feb. 19, 2020   (KR) .......................... 10-2020-0020682

(51) Int. Cl.
*B65G 15/12*       (2006.01)
*B65B 69/00*       (2006.01)
*B65G 47/91*       (2006.01)

(52) U.S. Cl.
CPC .............. *B65G 15/12* (2013.01); *B65B 69/00* (2013.01); *B65G 47/914* (2013.01);
(Continued)

(58) Field of Classification Search
CPC .... B65G 15/12; B65G 47/914; B65G 47/918; B65G 2201/025; B65G 2207/14;
(Continued)

(56) References Cited

U.S. PATENT DOCUMENTS 2,324,401 A  *  7/1943  Kimball ................. B65B 51/02
                                                  53/376.5
4,232,782 A     11/1980  Ikeda et al.
(Continued)

FOREIGN PATENT DOCUMENTS

CN    107954039 A  *  4/2018   ......... B65B 69/0033
DE    3320459   A  * 12/1984   ............... A24B 3/00
(Continued)

OTHER PUBLICATIONS

International Search Report from WIPO in Application No. PCT/KR2021/002133 dated May 7, 2021, 7 pages.
(Continued)

*Primary Examiner* — Gene O Crawford
*Assistant Examiner* — Abby A Jorgensen
(74) *Attorney, Agent, or Firm* — DILWORTH IP, LLC

(57) ABSTRACT

A reversing system for reversing a packing box, an upper surface of which is opened, and from which products are withdrawn, such that a lower surface of the reversed empty packing box is disposed above. A first conveyor transfers an empty packing box, an upper surface of which is opened,
(Continued)

from a position at which products are withdrawn from the packing box to a position at which the packing box is reversed. A turning device holds the packing box to be turned about a horizontal rotation axis, and reverses the packing box. A second conveyor carries the reversed packing box to a position at which the bottom surface is opened. The turning device holds two sides, facing each other, among sides of the packing box, and turns and reverses the packing box using a portion between the holding locations of the two held sides as a rotation axis.

3 Claims, 10 Drawing Sheets

(52) U.S. Cl.
CPC ...... *B65G 47/918* (2013.01); *B65G 2201/025* (2013.01); *B65G 2207/14* (2013.01); *B65G 2812/017* (2013.01)

(58) Field of Classification Search
CPC  B65G 2812/017; B65G 47/248; B65G 37/00; B65B 69/00; B65B 69/0033; B65B 7/20; B65B 51/02; B65B 43/39
See application file for complete search history.

(56) References Cited

U.S. PATENT DOCUMENTS

| | | | | |
|---|---|---|---|---|
| 4,988,255 A | * | 1/1991 | Hoffman | ................ B65B 69/00 |
| | | | | 414/412 |
| 6,226,965 B1 | * | 5/2001 | Lam | ....................... B65B 51/02 |
| | | | | 493/333 |

FOREIGN PATENT DOCUMENTS

| | | | | | |
|---|---|---|---|---|---|
| DE | 3320459 | A1 | | 12/1984 | |
| JP | 07149427 | A | | 6/1995 | |
| JP | 0912133 | A | | 1/1997 | |
| JP | 09012133 | A | | 1/1997 | |
| JP | H1191746 | A | * | 4/1999 | |
| JP | 2005047555 | A | * | 2/2005 | |
| KR | 10-2008-0089845 | A | | 3/2009 | |
| KR | 20190073734 | A | * | 6/2019 | |
| KR | 10-2019-0073734 | A | | 11/2019 | |
| KR | 10-2158643 | B1 | | 9/2020 | |
| WO | WO-9417989 | A1 | * | 8/1994 | ............... B31B 1/06 |
| WO | WO-9522492 | A2 | * | 8/1995 | ............... B31B 1/06 |
| WO | WO-2019104321 | A1 | * | 5/2019 | ............ B65B 51/02 |

OTHER PUBLICATIONS

Examination Report No. 1 issued in corresponding Australian Application No. 2021222857, issue on Sep. 29, 2023.
Extended European Search Report issued in EP Application No. 21757023.3, dated Nov. 13, 2023.

* cited by examiner

SYSTEM FOR INVERTING PACKAGING BOX

FIELD OF THE INVENTION

The present disclosure relates to a reversing system for packing boxes, and more particularly, to a reversing system for packing boxes, one surface of each of which is opened, and from each of which products are withdrawn, wherein the reversing system reverses packing the empty packing box such that a surface of the packing box opposite to the one opened surface is opened.

BACKGROUND OF THE INVENTION

Boxes having a cuboidal shape are widely used as packing containers for transporting and storing products.

FIG. 1 illustrates a packing box of a widely used shape.

A packing box 1 is made up of a panel of a paper material that is mainly coated with a synthetic resin film, and upper and lower surfaces thereof are covered and closed by four upper and lower surface panels in which upper and lower surfaces extend from sides.

Since the upper and lower surfaces have the same structure, the upper surface will be mainly described with reference to FIG. 1. Two of four upper surface panels 2 to 5 make a pair, and are folded from edges of the sides so that ends thereof come into contact with each other or become adjacent to each other, and thereby close the upper surface. A pair of second upper surface panels 4 and 5 are folded face to face, and then another pair of first upper surface panels 2 and 3 are folded face to face, and are disposed with an orientation perpendicular to the second upper surface panels 4 and 5 folded in advance.

In this manner, the upper surface of the box is closed, opposite ends of the first upper surface panels 2 and 3 which are folded and disposed above are coupled with an adhesive tape, and thereby are closed so that the packing box 1 cannot be opened by external force.

The packing box 1 is closed by first configuring the lower surface in the same manner as the upper surface, and disposing the products from the upper surface to contain it in an interior of the packing box 1. Then, as described above, the packing box 1 is closed by folding the upper surface panels 2 to 5 and by coupling ends of the first panels 2 and 3 using an adhesive tape, and the closed packing box 1 is transported.

Meanwhile, when the packing box 1, which is configured in this manner and contains the products, is opened to be intended to withdraw the products, the adhesive tape coupling the first panels 2 and 3 with each other is cut, and all the second panels 2 and 5 are unfolded outwardly to open the upper surface, the products held in the inner portion of the packing box 1 are withdrawn.

After the products are withdrawn, the lower surface of the empty packing box 1 is unfolded in the same manner as the upper surface of the empty packing box 1, the packing box 1 is folded and stacked, and is discharged as a recycling source.

In this manner, the work of opening the packing box 1, the work of drawing (or attracting) the products from the packing box 1, the work of aligning and carrying the withdrawn products, and the work of collecting the empty box from which the products are withdrawn for the purpose of recycling typically depends on manual labor of a worker.

This manual labor delays a work time, requires a lot of expenditure, and is conducted by a person so that there may occurs a case in which a task is not properly conducted.

In Korean Patent Publication No. 10-1554009 (Document 1) and No. 10-1527654 (Document 2), a configuration to facilitate withdrawing of the products from the packing box is disclosed, but no consideration is taken with regard to a configuration of automatically conducting post processing the empty packing box for waste or recycling after the products are withdrawn therefrom.

SUMMARY OF THE INVENTION

Technical Problem

The present disclosure discloses a configuration that is to intend to provide a reversing system that reverses a packing box so as to reverse an empty packing box, one surface of which is open and from which products are withdrawn, and to open a surface opposite to the one opened surface.

To be specific, the present disclosure is to intend to provide the reversing system in which work of reversing the empty packing box can be automatically carried out.

Further, the present disclosure is intended to provide the reversing system that reverses the empty packing box so as to enable an unopened opposite surface thereof to be opened without intervention of work of a person after the products are withdrawn from the packing box, one surface of which is opened.

Technical Solution

According to the present disclosure for realizing at least one of the aforementioned objects, provided is a reversing system for a packing box according to the present disclosure, wherein the reversing system reverses a box, an upper surface of which is opened, and from which products are withdrawn, so that a lower surface of the reversed empty box is disposed on an upper side thereof.

The reversing system according to the present disclosure includes:

a first conveyor configured to transfer an empty packing box, an upper surface of which is opened, from a withdrawn position at which products are withdrawn from a packing box to a reversed position at which a reversing operation is performed; a turning device configured to hold the packing box to be turned about a rotation axis horizontal to the ground, and to reverse the packing box; and a second conveyor configured to carry the reversed packing box to a position in which a work of opening the bottom surface is conducted, wherein the turning device holds two sides, facing each other, among sides of the packing box, and to cause the packing box to be turned and reversed using a portion between the holding locations of the two held sides, as a rotation axis.

The turning device may hold two held sides, facing each other, among the sides of the packing box, and may turn and reverse the two held sides using a portion, which exists between the holding locations of the two held sides, as the rotation axis.

In the reversing system of the present disclosure, the products may be withdrawn, and the empty packing box may be disposed at the reversed position by the first conveyor. The upper and lower surfaces of the disposed empty packing box may be inversed and carried to the position at which the lower surface is opened by the second conveyor.

As additional features of the present disclosure, in the reversing system of the present disclosure, an upper surface panel covering an upper surface of a packing box may be provided on the upper surface, and an upper surface panel may be introduced into the reversing system when drawing (or attracting) products in an unfolded state, and the turning device may include: a movable frame that is actuated upwardly and downwardly in a reversed position, a pair of suction units that are respectively disposed at positions facing each other, is actuated to approximate to or be separated from each other, and is provided with suction members configured to draw the sides of the packing box at an approximated time; and bars actuated upwardly and downwardly by the movable frame and configured to cause the upper surface panel of opened and unfolded state to come into close contact with the sides.

The empty packing box from which the products are withdrawn may be in a state in which the opened upper surface panel is unfolded. Accordingly, the upper surface panel may become a barrier factor in automatizing post-treatment of the empty packing box.

In the aforementioned additional configuration of the present disclosure, prior to an operation of reversing the packing box, the packing box may be drawn after the side panels are brought in close contact with the sides of the packing box, and the turning operation may be conducted by raising the packing box from the conveyor.

The upper surface panel unfolded by this operation does not become an obstacle to the upper surface panel of the packing box. Especially, without installing a separate unit for folding the upper surface panel of the packing box, an actuation of closely bringing the upper surface panel into close contact may be conducted together by the turning device.

Meanwhile, the upper surface panel may be comprised of a pair of first upper surface panels that are disposed vertically and face each other. There is a case in which the upper surface panels are configured as a pair, but a typical packing box has a pair of the upper surface panels.

In this case, in the reversing system of the present disclosure, the bars may include a plurality of bars extending in parallel with the drawing direction of the suction members, wherein each of the bars comes into contact with each of the first upper surface panels when upward actuation of the movable frame, each of the suction units is provided with a mounting panel to which the suction member is attached, and each of the mounting panels may be configured to come into contact with each of the second upper surface panels at a time of downward actuation of the movable frame and to come into close contact with the sides of the packing box by the downward actuation.

For the purpose of the reverse of the packing box, the movable frame is moved downwardly so that the packing box disposed on the first to second conveyors is held by the suction member, and is moved downwardly in order to turn the packing box after the movable frame is raised in a held state, and to turn the packing box to again put down the reversed packing box on the first to second conveyors.

In addition to the lifting motion for rotation of this packing box, when the packing box at which the reverse of any one of the packing boxes is completed and treated is withdrawn, the movable frame is raised to enter a waiting period. When the next packing box is introduced, the movable frame is moved downwardly to hold the packing box.

According to the aforementioned configuration, an operation in which the upper surface panel of the packing box introduced by downward movement actuation in order to hold this newly introduced packing box comes into close contact with the sides of the packing box may be conducted. That is, the leading end of the mounting panel and bars bring the upper surface panel into contact with the sides of the packing box while the leading end of the mounting panel and the bars may be moved downwardly while butted with the first and second upper surface panels by the downward movement operation of the movable frame.

Meanwhile, a plurality of suction members are provided to each of the suction unit, the suction members disposed below the turning axis of the turning device are drawn by coming into contact with the sides of the packing box may be preferred to be drawn to the second upper surface panel of the packing box by coming into contact with the second upper surface panel of the packing box.

As one of the specific embodiments of the reversing system of the present disclosure, the movable frame may be moved upwardly and downwardly, and may include a first frame extending to be parallel with a turning axis of the packing box, and a pair of second frames respectively disposed at opposite ends of the first frame and extending in a vertical direction, wherein the second frames are coupled to be move away from and approximate to the first frame in the turning axis of the packing box, and each of the suction units is provided with mounting panels to which the suction members are attached, and a rotation driving motor which is provided to each of the second frames, is rotatably driven using the rotation axis of the packing box that turns and drives the mounting panels as a rotation shaft is configured to rotate the mounting panels.

As additional features of the present disclosure, the second conveyor may include a pair of conveyor belts extending from a reversed position to an opened position of a bottom surface of the packing box and parallel to each other, the first conveyor may include a pair of conveyor belts disposed at the reversed position and extending between the conveyor belts of the second conveyor so as to be perpendicular to the second conveyor, and the reversing system may further include a third conveyor extending from an outer portion to a position adjacent to the second conveyor.

Advantageous Effects

In the reversing system according to the present disclosure, the empty packing box from which products are withdrawn has upper and lower surfaces reversed automatically and can be treated for waste or recycle.

In order to bring two pairs of upper surface panels in close contact with the packing box, the turning device conducts a close contact operation of the downward motion of a movable frame by the downward motion of the movable frame without being provided with a configuration for a separate motion.

Since the close contact operation is conducted without conducting a separate motion for bringing the upper surface panels of the packing box in close contact, a process time is reduced. Further, since a separate actuation unit for the close contact operation is not required, the configuration of the reversing system can be simplified and produced cheaply.

Since the suction members are disposed above and below a turning axis of the packing box, the reverse motion of the packing box is stably made, and the packing box is prevented from being separated during turning.

According to the present disclosure, the configuration of the reversing system is made compact by the disposition of the conveyors for carrying the packing box, and interference between various devices is removed.

DETAILED DESCRIPTION OF THE INVENTION

Hereinafter, as details for implementing the present disclosure, a configuration and an operation of a reversing system for packing boxes according to an embodiment of the present disclosure will be described with reference to the drawings.

Figure 1:
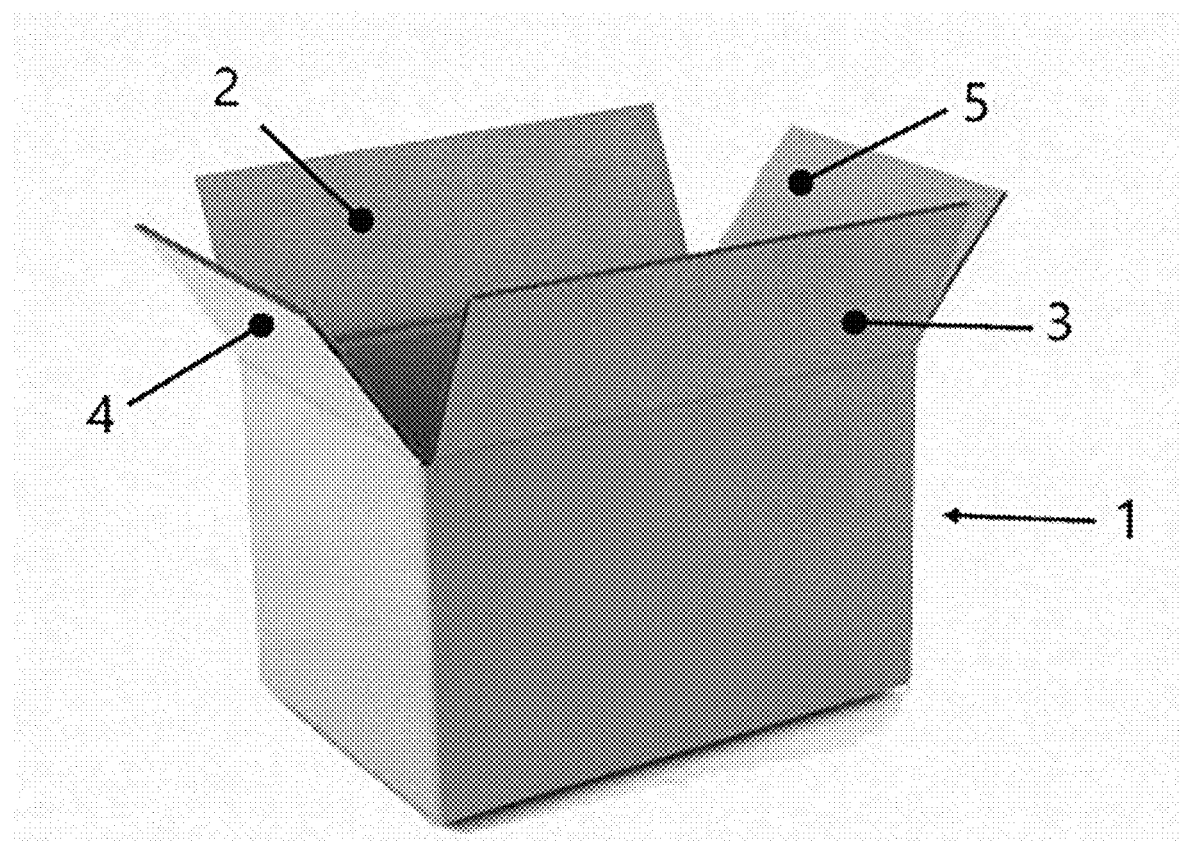
FIG. 1 is a perspective view illustrating a state in which a packing box of a type used in an inverse system of an embodiment of the present disclosure.

The reversing system of the present embodiment is configured to reverse an empty box after products are withdrawn from the packing box having the configuration illustrated in FIG. 1.

After the adhesive tape coupling the first upper surface panels 2 and 3 is cut and then the products are withdrawn from the packing box 1 in a state where the four upper surface panels 2 to 5 are unfolded, the packing box 1 is carried to the reversing system of the present embodiment by a conveyor belt or another carrying means In the reversing system of the present embodiment, after the packing box 1 is discharged from the reversing system of the present embodiment, and then the adhesive tape is cut such that the panels covering the lower surface are opened are folded, the packing box 1 is stacked on another one, and is carried to another place for recycling.

First, an overall configuration of the reversing system of the present embodiment will be described with reference to FIGS. 2 to 4.

The reversing system of the present embodiment generally includes third conveyors 90 that convey the empty packing box 1 from the position at which the products are withdrawn to a position adjacent to a position at which the packing box 1 will be reversed, second conveyors 80 that are disposed perpendicular to the third conveyors 90 and convey the reversed packing box 1 to a position at which the panels of the lower surface are opened, first conveyors 70 that are disposed between the second conveyors 80 so as to be perpendicular to the second conveyors 80 and place the packing box 1 conveyed by the third conveyors 90 at a reversed position, a turning device 30 that holds, rotates, and reverses the packing box 1 that is disposed at the reversed position by the first conveyors 70, first and second stoppers 21 and 22 that allow the packing box 1 to be disposed at the reversed position, and a main frame 10 at which the turning device 30, the stoppers 21 and 22, and the first to third conveyors 70 to 90 are installed.

The main frame 10 may be made up of several frames configured independently of one another. Either an opening system of the packing box 1 or a withdrawing system for withdrawing the products from the packing box 1 may be disposed in this main frame 10 in addition to the reversing system of the present embodiment.

Hereinafter, for the sake of convenience, the main frame 10 is treated as a single element, and is disposed at positions different from each other. The frames belonging to the main frames 10 are referred to as the main frames, and are indicated by the same reference number.

First, a configuration of the turning device 30 will be described with reference to FIGS. 5 to 7.

The turning device 30 holds and rotates the packing box 1 disposed at the reversed position by the first and third conveyors 70 and 90.

Conveyor belts of the first to third conveyors 70 to 90 are disposed on the same plane that is approximately parallel to the ground, and the turning device 30 is installed at a portion extending upwardly from this plane at the main frame 10.

The main frame 10 includes four vertical channels 11 extending vertically and a horizontal channel 12 extending horizontally between upper ends of the vertical channels 11. A space enclosed by the vertical channels 11 and the horizontal channel 12 form a reversing place in which the packing box 1 is reversed. Components of the turning device 30 are coupled to or suspended from the horizontal channel 12.

The turning device 30 includes movable frames 31 and 32 suspending from the horizontal channel 12 and configured to be movable upwardly and downwardly.

A vertically actuatable pneumatic cylinder 41 and four vertically extending linear guides 42 are coupled to the horizontal channels 12. A first frame 31 extending in parallel with a rotation axis (A of FIG. 7) serving as the rotation center of the packing box 1, and a pair of second frames 32 extending in a vertical direction, are provided on a leading end of the pneumatic cylinder 41 and leading ends of the linear guides 42.

According to this configuration, when the pneumatic cylinder 41 is driven upwardly and downwardly, the first frame 31 and the second frames 32 are guided by the linear guides 42, and are actuated in the vertical direction.

Linear actuators 43 including the pneumatic cylinder 41 and the linear guides 42 are provided at opposite ends of the first frame 31. The linear actuators 43 are driven in an extending direction of the first frame 31, i.e. in a direction of the rotation axis A, and upper ends of the second frames 32 are coupled to leading ends of the linear actuators 43.

According to this configuration, when the linear actuators 43 are driven, the second frames 32 are actuated in a direction as the same as or opposite to each other.

Rotation driving motors 44 are coupled to lower ends of the respective second frames 32. Rotation shafts (not illustrated) of the rotation driving motors 44 are disposed on the rotation axis A, and are fixedly coupled to the second frames 32.

Mounting panels 33, on which suction members 45 and 46 as suction units are disposed, are coupled to lower ends of the respective second frames 32. The mounting panels 33 are coupled to the rotation shafts of the rotation driving motors 44 so as to be rotatable.

The two mounting panels 33 are disposed to face each other, and a total of five suction members 45 and 46 are coupled to opposite surfaces of the mounting panels 33. The three first suction members 45 are disposed in parallel at an upper side of the rotation axis A, and the two second suction members 46 are disposed at a lower side of the rotation axis A.

The suction members 45 and 46 are connected to a vacuum source to draw an object under vacuum, and function to draw and fix the packing box 1 disposed between the mounting panels 33. This will be described below, the first suction members 45 draw (or attract) the upper surface panels 2 and 3 which are opened from the packing box 1, and second suction members 46 draw the sides of the packing box 1.

Figure 4:
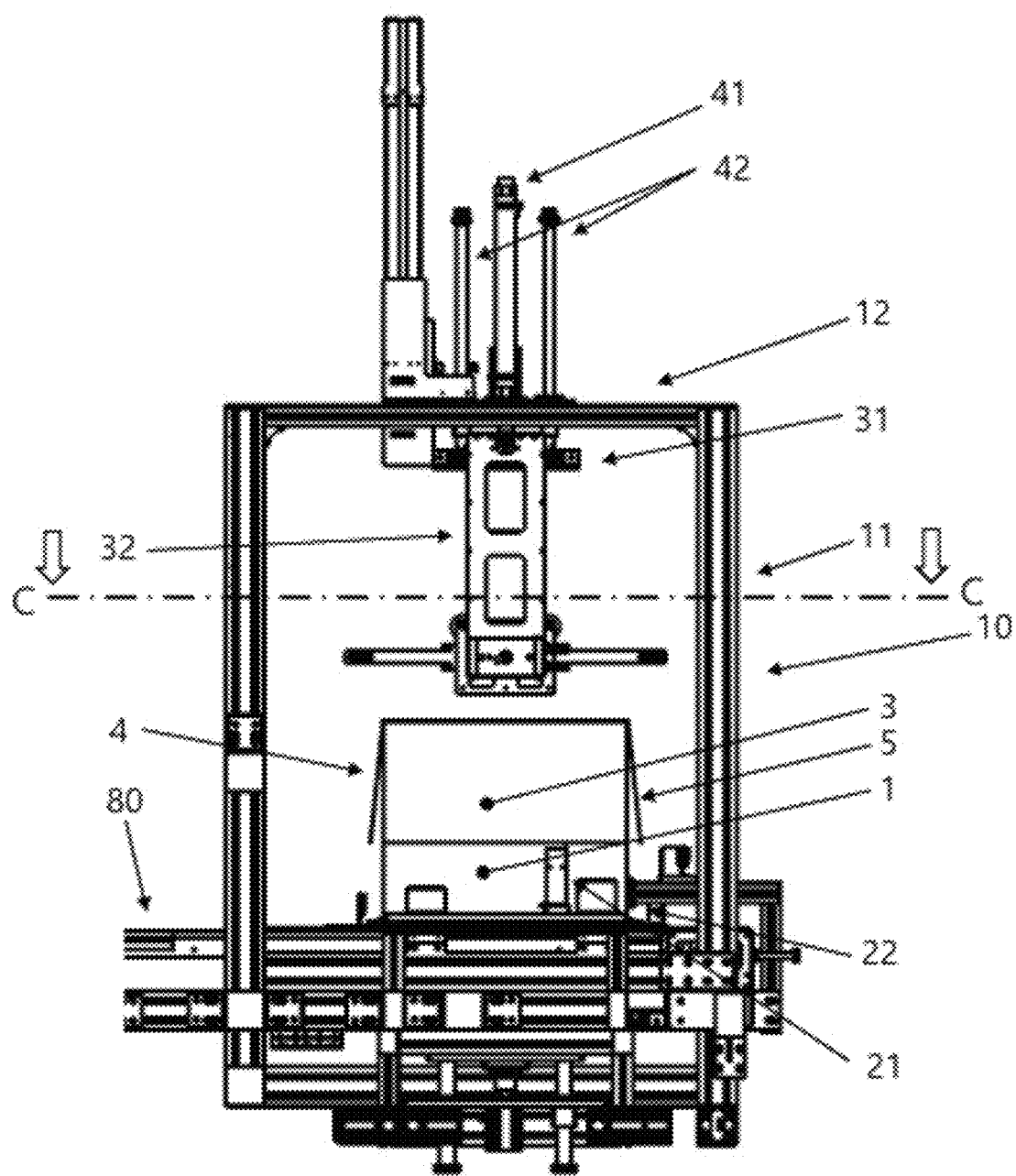
FIG. 4 is a longitudinal cross-section view taken along line B-B of FIG. 2.
Figure 5:
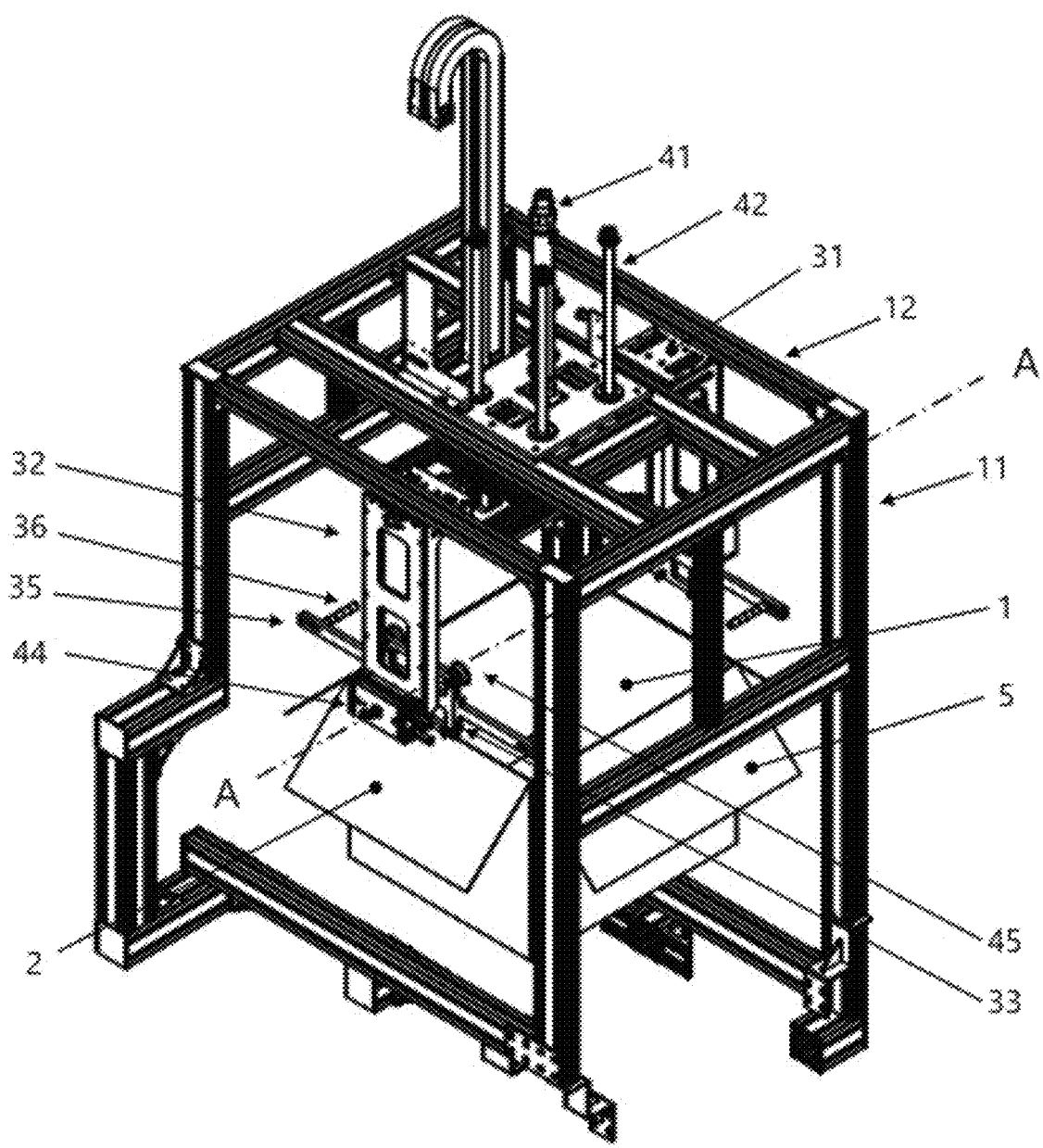
FIG. 5 is a perspective view illustrating only a rotary device and a main frame in the inverse system of the embodiment of the present disclosure.
Figure 6:
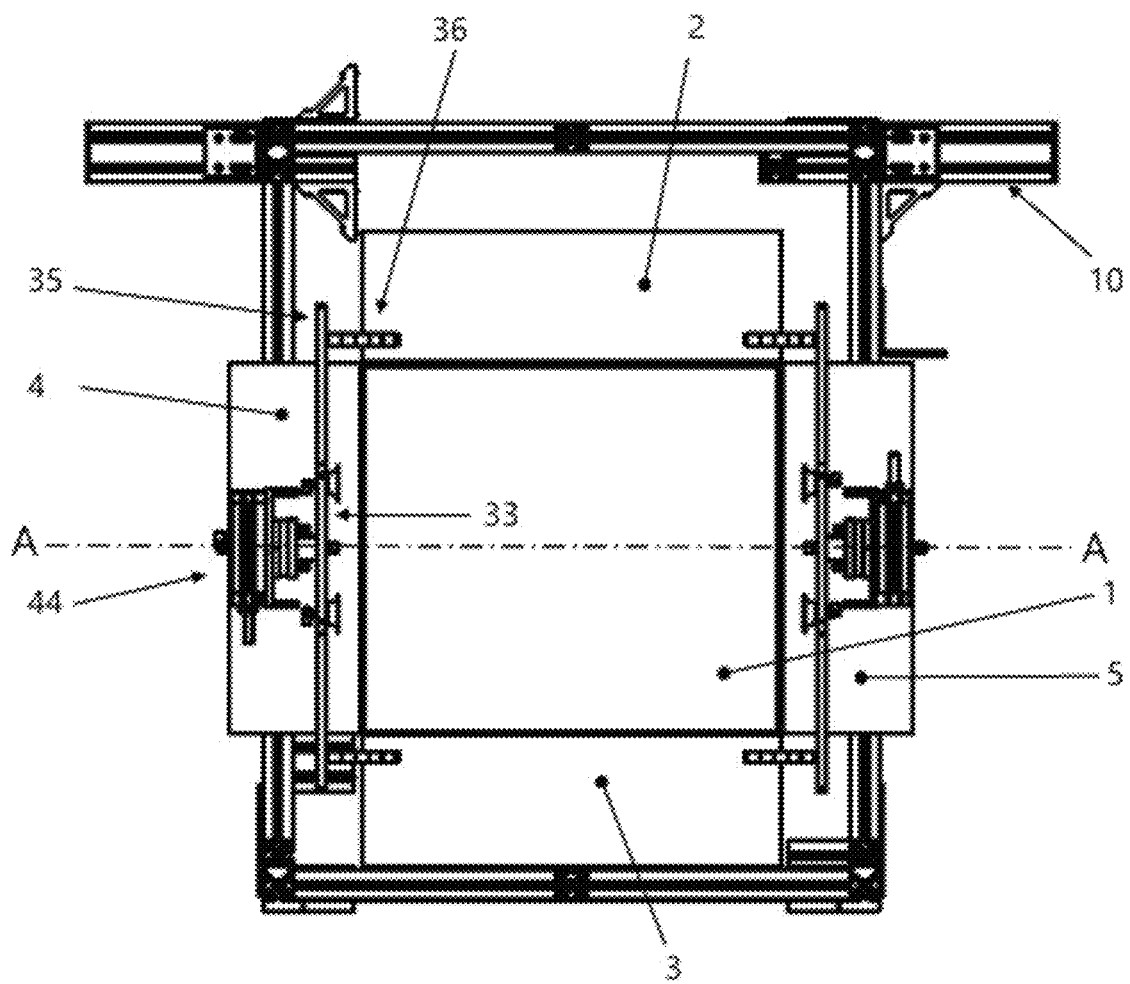
FIG. 6 is a view illustrating only the rotary device and the main frame in the inverse system of the embodiment of the present disclosure as in FIG. 5, and is a longitudinal cross-section view taken along line C-C of FIG. 4.
Figure 7:
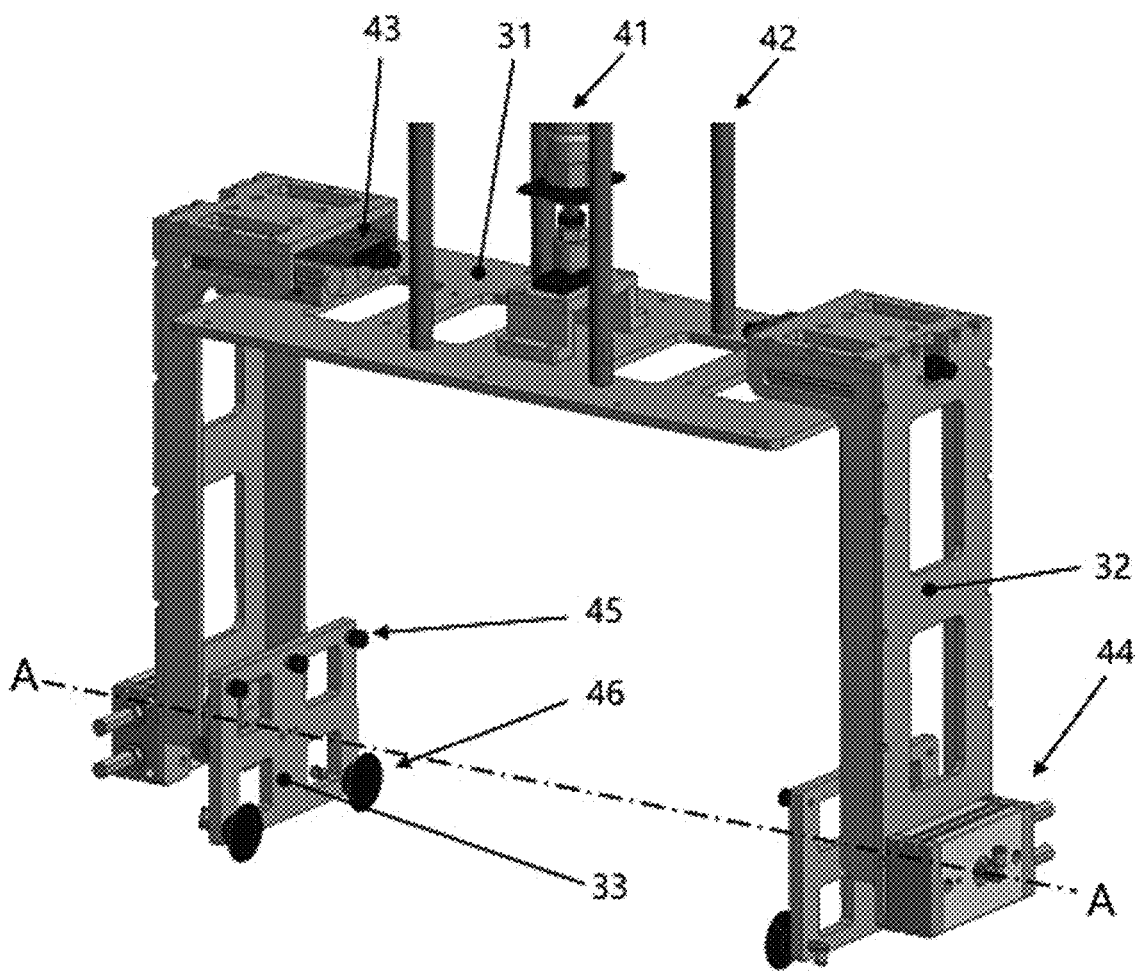
FIG. 7 is a view illustrating only parts of the configuration of the rotary device illustrated in FIGS. 5 and 6.

Although not illustrated in FIG. 6, when referring to FIGS. 4 and 5, the mounting bracket 35 extend from the mounting panels 33 at opposite sides of each of the mounting panels 33, and bars 36 are coupled to leading ends of each of the mounting brackets 35.

The bars 36 extend from the leading ends of the mounting brackets 35 in a direction parallel with the rotation axis A. The two bars 36 coupled to one of the mounting panels 33 are separated in a width direction of the packing box 1.

Next, configurations of the first to third conveyors and configurations of the stoppers 21 and 22 will again be described with reference to FIGS. 2 to 4.

The third conveyors 90 include two conveyor belts extending in parallel with each other. The third conveyors 90 extend from a position, at which an empty packing box 1 is disposed after the products are withdrawn, to a position at which the second conveyors 80 are disposed.

The second conveyors 80 also include two conveyor belts extending in parallel with each other, and extending from the reversed position to a position at which the bottom surface of the reversed packing box 1 is opened.

Since extending directions of the third conveyors 90 and the second conveyors 80 are in perpendicular to each other, a direction in which the third conveyors 90 introducing the packing box 1 into the lower portion of the turning device 30 and a direction in which the second conveyors 80 draw the reversed packing box 1 from the lower portion of the turning device 30 become perpendicular to each other.

Meanwhile, the first conveyors 70 also include two conveyor belts extending in parallel with each other, the conveyor belts, and rollers (not illustrated) and motors (not illustrated) that turn and drive the conveyor belts constitute one assembly, and pneumatic cylinders and linear guides are provided as lifting devices (not illustrated) that vertically lift this assembly.

The first conveyors 70 are disposed in a straight line with the third conveyors 90, with respect to each other, and a pair of conveyor belts constituting the first conveyors 70 are disposed between a pair of conveyor belts constituting the second conveyor belts 80.

According to this configuration, when introducing the packing box 1 from the position at which the products are withdrawn to the lower portion of the turning device 30, i.e., the reversed position, the first conveyors 70 are raised to the upper sides of the second conveyors 80 by the lifting device (not illustrated), receive the packing box 1 introduced by the third conveyors 90, and cause the received packing box 1 to be disposed at the reversed position.

When the packing box 1 is disposed at the reversed position, the first conveyors 70 move down, and the packing box 1 is supported by the second conveyors 80, and the reverse actuation caused by the turning device 30 is carried out. However, the first conveyors 70 may be disposed at the same height as the second conveyors 80 so as to support the packing box 1 together with the second conveyors 80, and the first conveyors 70 may support the packing box 1 during the reverse actuation caused by the turning device 30.

A first stopper 21, which is disposed toward the direction opposite to the introducing direction of the packing box 1, is disposed, and a second stopper 22, which is disposed toward the direction in which the third conveyors 90 draw the packing box 1, is disposed.

The packing box 1 is disposed at the reversed position by actuation control of the first to third conveyors 70 to 90, but during the reverse actuation, the movement of the packing box 1 is restricted to cause dislocation to be removed so that the suction members 45 and 46 and the bars 36 accurately hold the packing box 1 during the reverse actuation.

Figure 8:
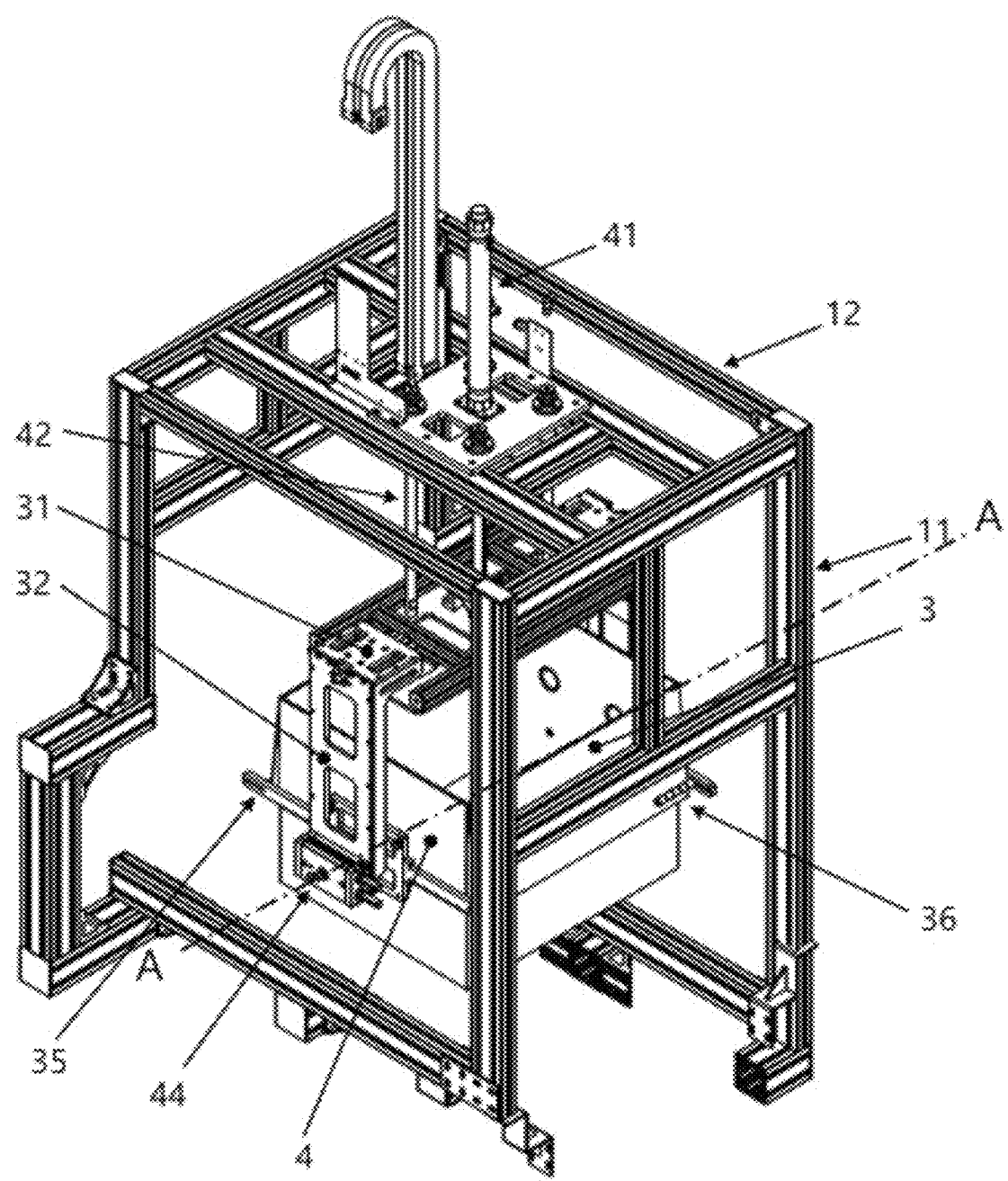
FIGS. 8 to 10 are a perspective view, a front view, and a side view illustrating a state in which the rotary device holds the packing box in the inverse system of the embodiment of the present disclosure.
Figure 9:
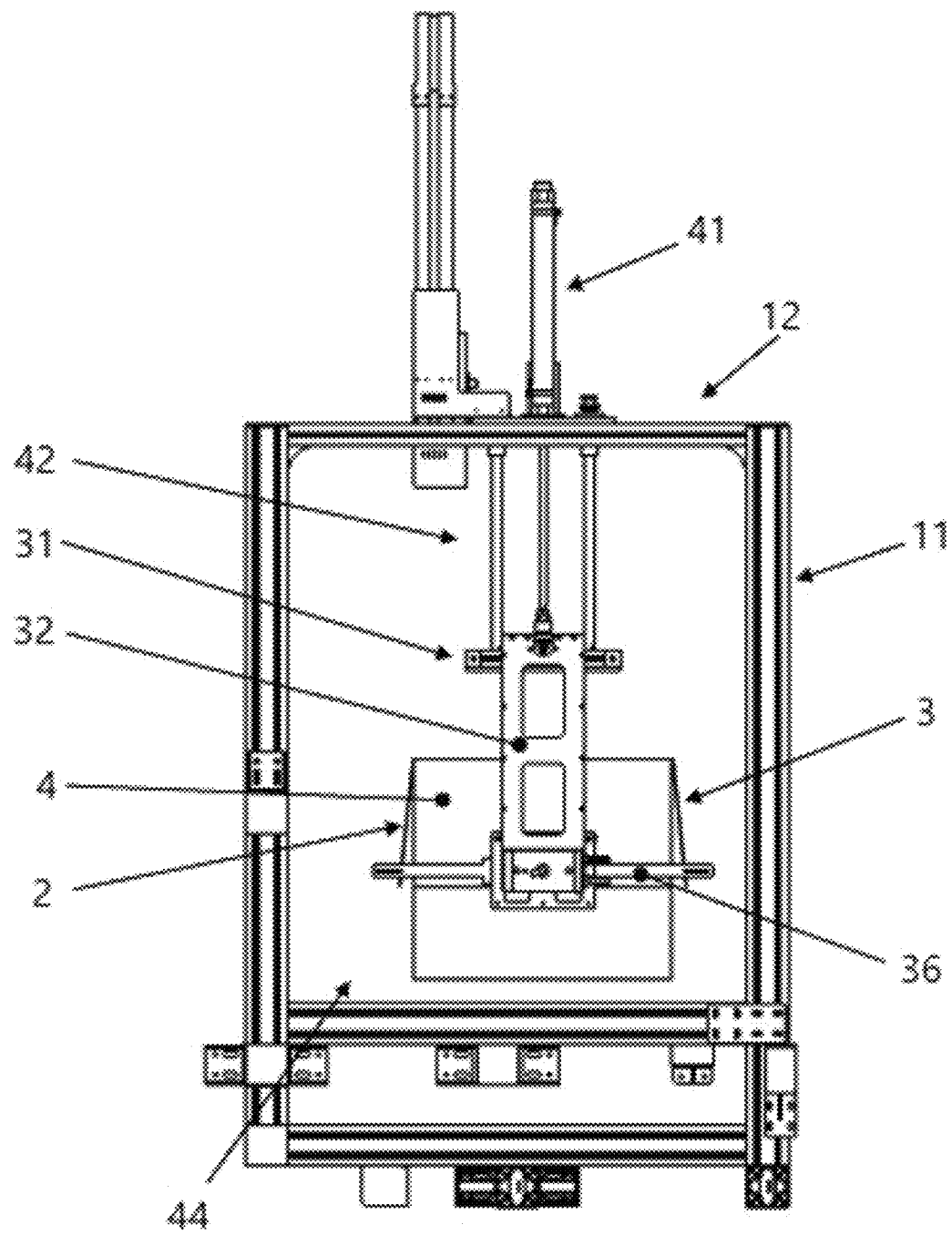
Figure 10:
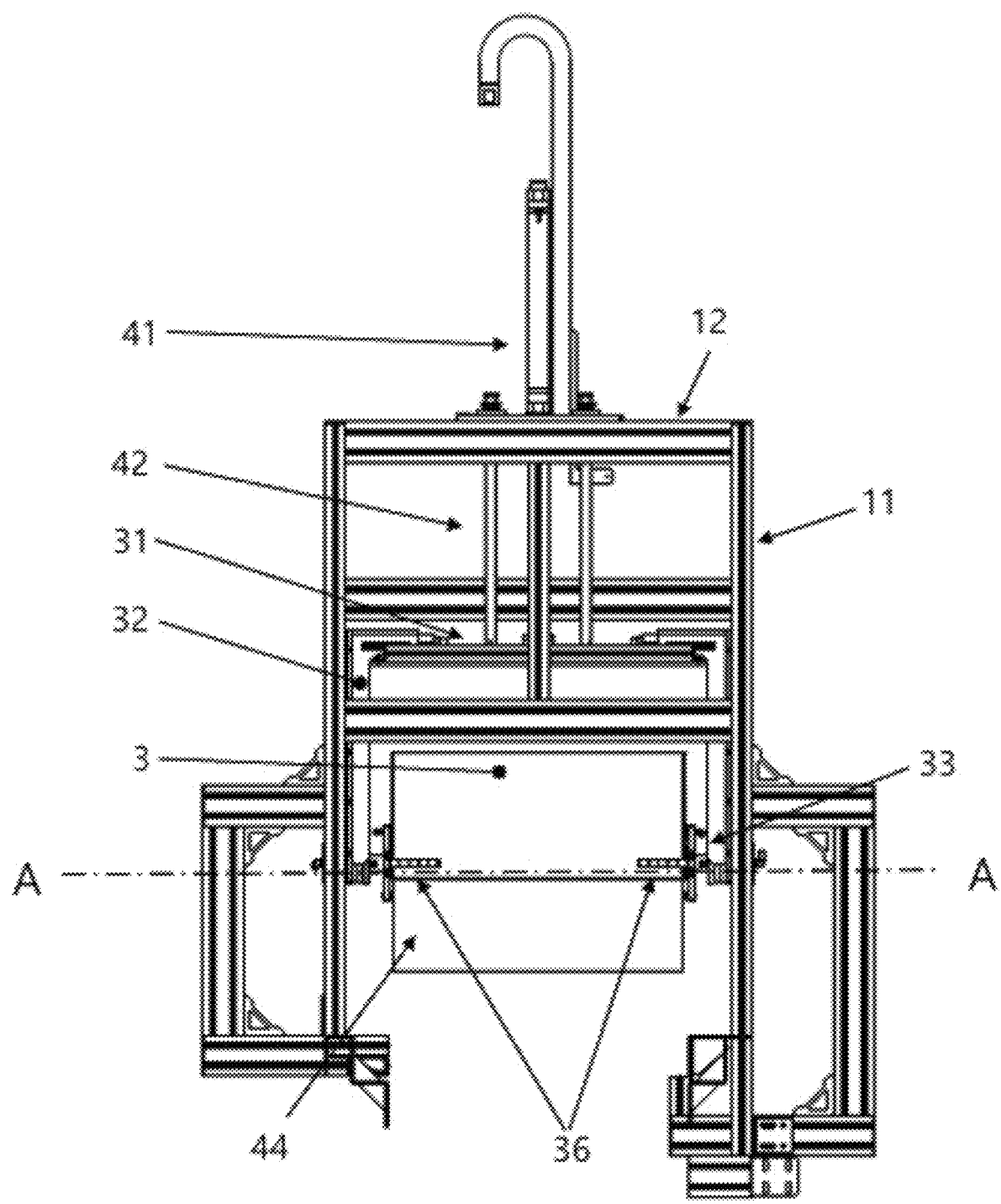

The reverse actuation of the packing box 1 according to the configuration as described above will be described with reference to FIGS. 8 to 10.

Figure 2:
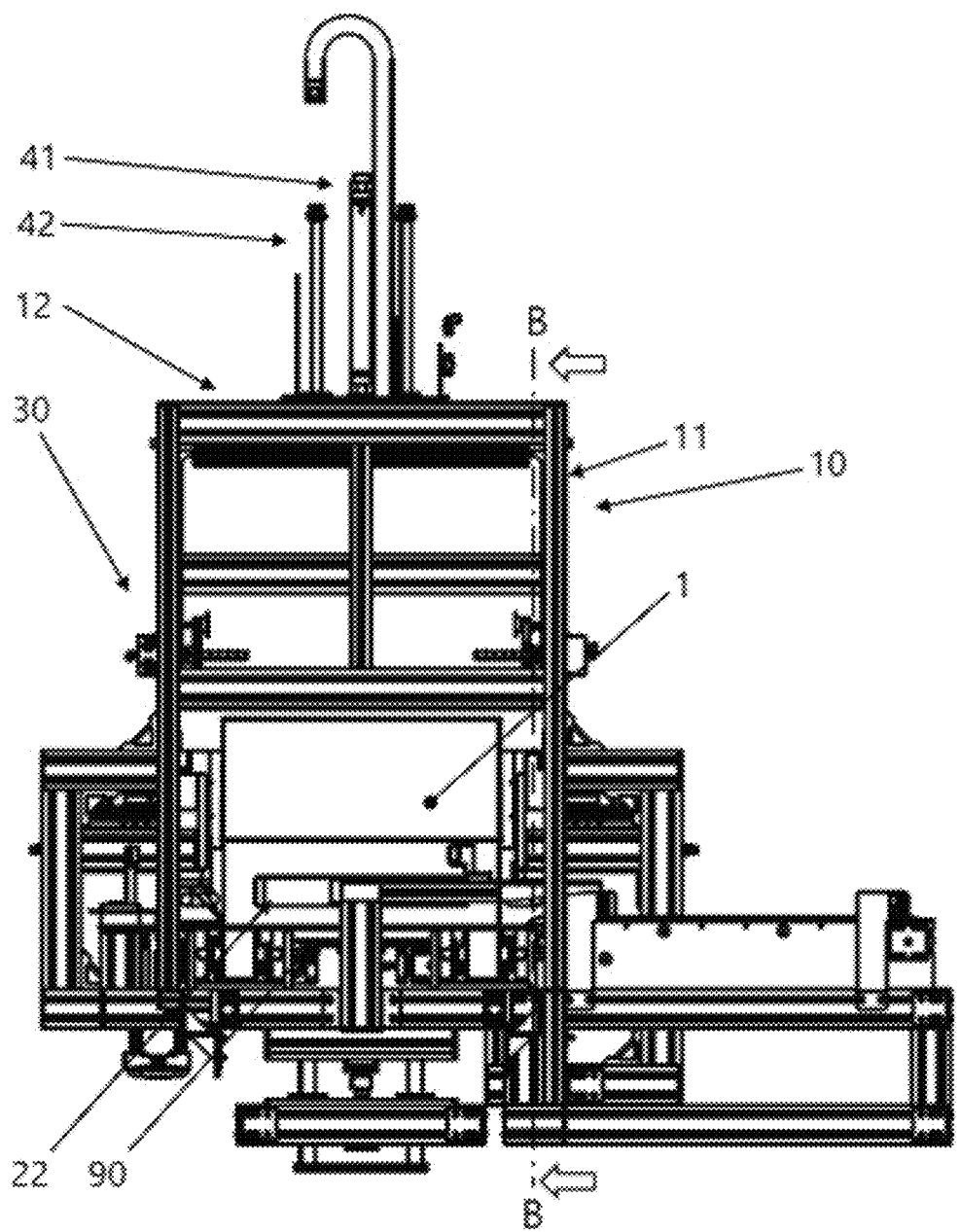
FIGS. 2 and 3 are a front view and a plan view illustrating an overall configuration of the inverse system of the embodiment of the present disclosure.
Figure 3:
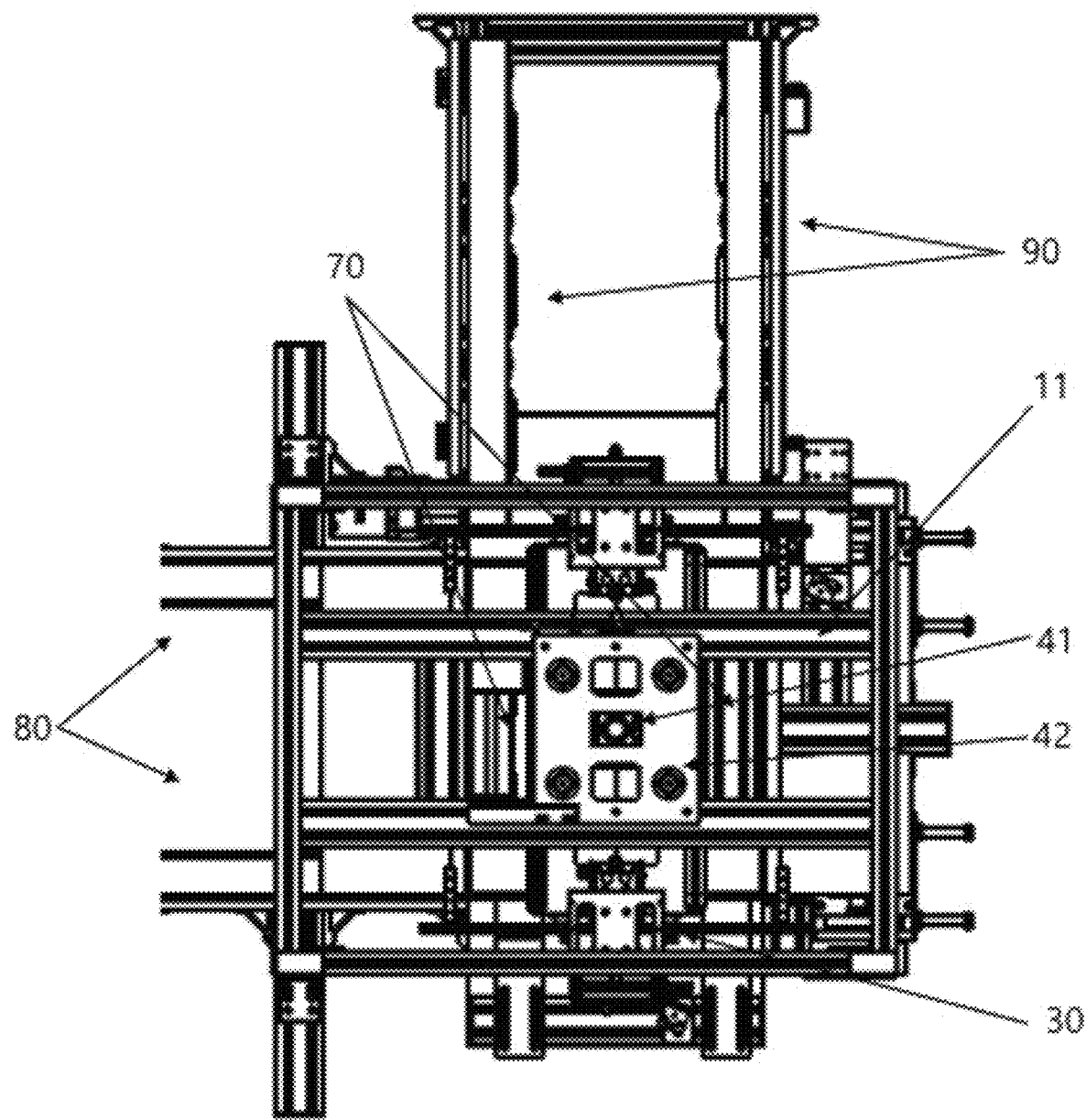

Before the packing box 1 is introduced, the turning device 30 is disposed at the raised position illustrated in FIG. 2. The pneumatic cylinder 41 is actuated in a contracted state, and raises the first and second frames 31 and 32 so that the suction members 45 and 46 and the bars 36 are disposed at the raised position. The second frames 32 are adapted in a state of being separated from each other by the contracted actuations of the linear actuators 43.

In this state, the packing box 1 is introduced to the reversed position by the first and third conveyors 70 and 90.

When the packing box 1 is safely disposed and supported by the second conveyors 80 or the first conveyors 70, the pneumatic cylinder 41 is enlarged and actuated, so that the first and second frames 31 and 32 are moved down, and the mounting panels 33, the suction members 45 and 46, and the bars 36, which are attached to the frames, are also moved down.

The mounting panels 33 and the bars 36 come into contact with the unfolded upper surface panels 2 and 6 by lowering actuation, respectively. The lower end faces of the mounting panels 33 are moved down while coming into contact with the two second upper surface panels 4 and 5, and bring the second upper surface panels 4 and 5 into close contact with the sides of the packing box 1. The respective bars 36 bring the first upper surface panels 2 and 3 into close contact with the sides of the packing box 1 while being in contact with the first upper surface panels 2 and 3.

When the lowering actuation is completed, the rotation shafts of the rotation driving motors 44 are disposed at approximately geometric centers of the mutually facing sides of the packing box 1. The geometric centers of the sides of the packing box 1 are disposed on the rotation axis A.

The linear actuators 43 are enlarged and actuated, so that the mounting panels 33 are moved in the directions approximating each other. Accordingly, the suction members 45 and 46 attached to the mounting panels 33 are brought in contact with the packing box 1.

The suction members 45 above the rotation axis A are in contact with the second upper surface panels 4 and 5 that are brought in close contact with the sides of the packing box 1, and the suction members 46 below the rotation axis A are in contact with the sides of the packing box 1. In this state, the suction members 45 and 46 perform the suction (or drawing or attraction) and the actuation to draw the packing box 1.

The pneumatic cylinder 41 conducts the contraction and the actuation in a drawn state, the turning device 30 is raised, and the packing box 1 is also raised in the drawn state.

After being raised from the second conveyors 80 by a given distance, the rotation driving motors 44 is rotated to turn the mounting panels 33 by an angle of 180 degrees. Accordingly, the packing box 1 is also turned and reversed by the angle of 180 degrees.

The pneumatic cylinder 41 is again enlarged and actuated, so that the turning device 30 is moved downwardly, and the packing box 1 is also moved downwardly in a drawn state, and is disposed above the second conveyors 80. Drawing actuations of the suction members 45 and 46 are stopped, and the linear actuators 43 are contracted and actuated, so that the mounting panels 33 are separated from each other. Accordingly, the packing box 1 is disposed on the second conveyors 80 in the reversed state. The second conveyors 80 are actuated and the products are withdrawn from the turning device.

In the packing box 1 withdrawn from the reversing system of the present embodiment, the panels closing the bottom surface are opened and folded, and then are stacked by overlapping with another packing box. However, this actuation is not the actuation caused by the reversing system of the present embodiment, and thus illustrations and descriptions thereof will be omitted.

In the packing box 1 in which the upper surface is opened and from which the products are withdrawn by the configuration and the actuation as described above, the reversed actuation by which the packing box is turned upside down is automatically conducted, and is carried for the post-treatment.

Hereinabove, the configuration and the operation of the reversing system for the packing box according to the embodiments of the present disclosure have been described, but various modifications and addition of elements are possible without departing from the claim without being limited to the foregoing embodiments.

The invention claimed is:

1. A reversing system for reversing a packing box, an upper surface of which is opened, and from which products are withdrawn, such that a lower surface of a reversed empty packing box is disposed above, the reversing system comprising:
   a first conveyor configured to transfer an empty packing box, an upper surface of which is opened, from a withdrawn position at which products are withdrawn from a packing box to a reversed position at which a reversing operation is performed;
   a turning device configured to hold the packing box to be turned about a rotation axis horizontal to the ground, and to reverse the packing box; and
   a second conveyor configured to carry the packing box to a position at which a work of opening a bottom surface is conducted,
   wherein the turning device holds two sides, facing each other, among sides of the packing box, and causes the packing box to be turned and reversed using a portion between holding locations of the two held sides as a rotation axis,
   wherein an upper surface panel covering the upper surface of the packing box is provided on the upper surface of the packing box, and introduced into the reversing system in an unfolded state when the products are withdrawn, wherein the upper surface panel comprises a pair of first upper surface panels facing each other and a pair of second upper surface panels that are disposed perpendicular to the first upper surface panels and face each other, and
   the turning device comprises a movable frame moved upwardly and downwardly at the reversed position, a pair of suction units that are disposed at positions facing each other, respectively and having suction members that are actuated to move toward or away from each other and that draw the sides of the packing box at an approximating time, and bars configured to bring the upper surface panel of opened and unfolded state into close contact,
   the bars comprise a plurality of bars extending in parallel with drawing directions of the suction members, each of the bars coming into contact with each of the first upper surface panels and bringing the first panels in contact with the packing box by a downward movement actuation, and
   each of the suction units provided with mounting panels to which the suction member s are attached, and each of the mounting panels brings a leading end thereof in close contact with each of the second upper surface panels and brings the second upper surface panels into close contact with the side of the packing box by the downward movement actuation,
   wherein each of the suction units is provided with a plurality of the suction members, and the suction members disposed on a side below the turning axis come into contact with the side of the packing box, and the suction members disposed on a side above the turning axis come into contact with the second upper surface panels of the packing box, and
   wherein the mounting panels are moved in the directions approximating each other as linear actuators are enlarged and actuated.

2. The reversing system according to claim 1, wherein the movable frame comprises a first frame that is moved upwardly and downwardly and extends in parallel with the turning axis of the packing box, and a pair of second frames that are disposed at opposite ends of the first frame and extend in a vertical direction,
   the second frames are coupled to the first frame to be moved in the turning axis direction of the packing box to move away from or toward each other, and
   each of the suction units is provided with mounting panels to which the suction members are attached, and each of the second frames is provided with rotation driving motors using the rotation axis of the packing box that rotatably drives the mounting panel as a rotation shaft so as to rotate the mounting panels.

3. The reversing system according to claim 1, wherein the second conveyor comprises a pair of conveyor belts extending from a reversed position to an opened position of the bottom surface of the packing box and parallel to each other,
   the first conveyor comprises a pair of conveyor belts disposed at the reversed position and extending perpendicular to the second conveyors between the conveyor belts of the second conveyor, and
   the reversing system further comprising a third conveyor extending from an outer portion to a position adjacent to the second conveyor so as to be perpendicular to the second conveyor.

* * * * *